United States Patent Office.

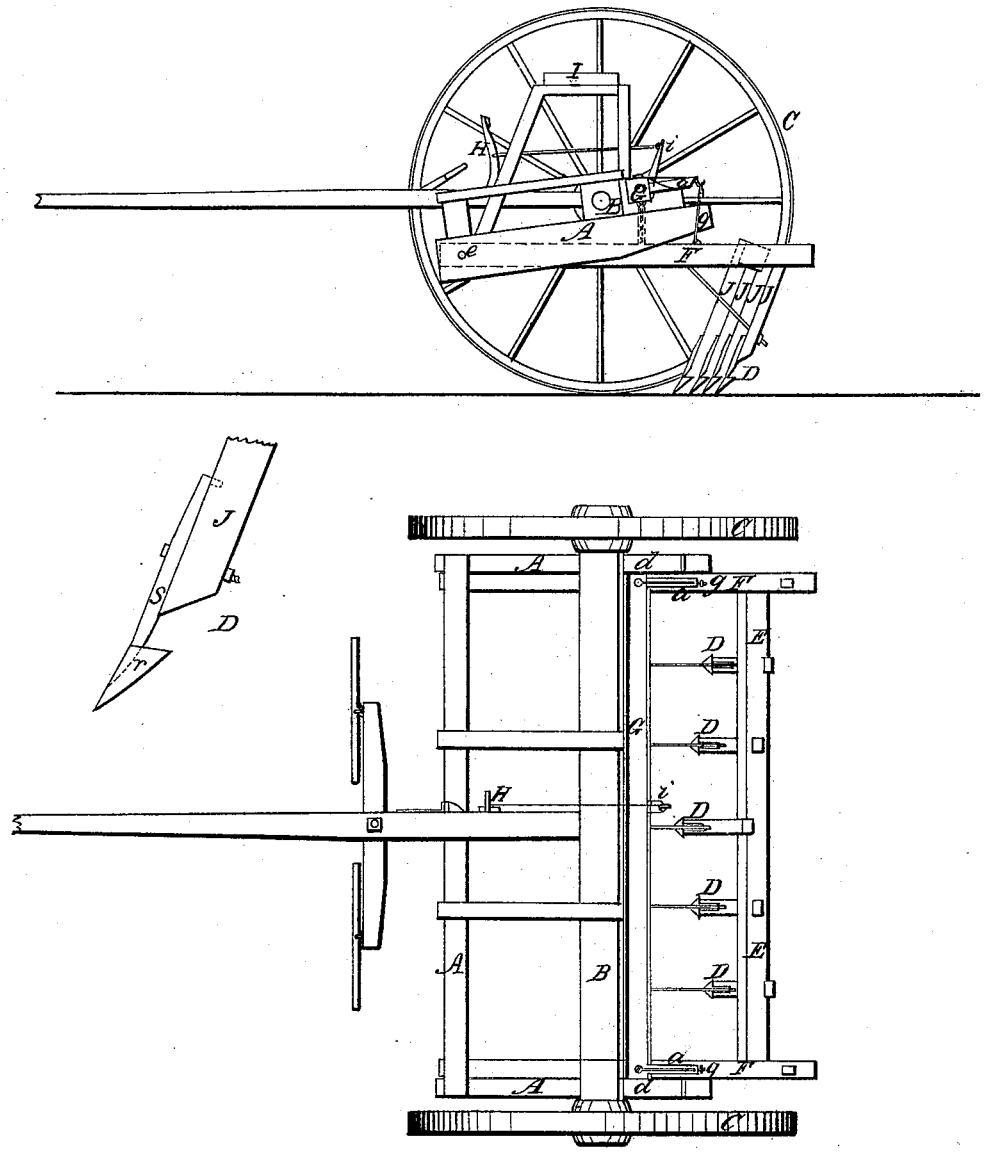

JOSEPH FOLTZ, OF VALLEY MILLS, INDIANA.

Letters Patent No. 90,939, dated June 8, 1869.

IMPROVEMENT IN HARROWS.

The Schedule referred to in these Letters Patent and making part of the same.

*To all whom it may concern:*

Be it known that I, JOSEPH FOLTZ, of Valley Mills, in the county of Marion, and State of Indiana, have invented new and useful Improvements in Harrows; and I do hereby declare that the following is a full, clear, and exact description thereof, that will enable skilled artisans to make and use the same, reference being had to the accompanying drawing, and to the letters of reference marked thereon, making part of this specification.

The nature of this invention will be more readily understood by a consideration of the objects sought to be accomplished, which are to more thoroughly pulverize the soil, and, incidental thereto, such a construction and arrangement of the several parts, that the depth to which the teeth enter the ground may be conveniently and perfectly regulated, and also by which they may be readily raised to pass over stumps, accumulated trash, or other obstructions.

Figure 1 is a vertical section of my improved harrow, taken just inside of one of the wheels.

Figure 2 is a top view of the same.

Figure 3 is a detached view of a tooth, somewhat enlarged, to show more clearly its construction.

Similar letters of reference indicate corresponding parts in the several figures.

A is the frame of the implement, to which all the other parts are attached.

This frame is attached to and supported by the axle-tree B, and is carried by the wheel C.

The teeth D are rigidly fixed to a beam, E, that forms part of a supplementary frame, F, that is hung on a pivot-rod, $e$, to the forward end of the frame A.

G is a rock-shaft or bar, having its bearings at $d$ $d$, and is furnished with arms $a$ $a$, from which linked rods $g$ $g$ extend to the side-pieces F of the supplementary frame.

Another arm, $i$, is fixed to the rock-shaft G, from which a rod extends to a foot-lever, H.

The supplementary frame is suspended at its rear end by chains, attached to hooks in the rock-shaft G, and it is by means of the said chains and hooks that the depth to which the teeth enter the ground is regulated.

I is a seat for the driver.

The teeth D are made somewhat different from those in ordinary use, the shank $s$ being a strong iron bar, furnished with a hook at the top, to enter the wooden stock J, to which it is also bolted, as clearly shown in fig. 3, and is also furnished with a narrow shovel, $r$, at the bottom.

These teeth are attached to the beam E and pieces F, so as to present a triangular form, the apex being the forward middle tooth, so that they will readily clear themselves of trash.

In order to free the teeth from an over-accumulation of stalks, &c., or to pass over stumps, stones, or other obstructions, the driver, by applying his foot to the lever H, can raise them from the ground, as will be readily understood.

This harrow may also be used as a corn-cultivator, by removing the middle tooth, so as to straddle one row, leaving the teeth on each side to run between the rows.

The implement is very conveniently turned at the ends of the corn-rows, or at the sides of the field, by raising the teeth, as described, for clearing them of trash.

Having thus fully described my invention,

What I claim as new, and desire to secure by Letters Patent, is—

The teeth D, constructed as shown, and attached to the supplementary adjustable frame E F, all arranged to operate substantially as and for the purpose set forth.

JOSEPH FOLTZ.

Witnesses:
WM. H. WEEKS,
O. F. MAYHEW.